Dec. 3, 1963   J. SADIER   3,112,664
MACHINE TOOL HAVING A TURRET HEAD AND AUXILIARY GUIDE MEANS
Filed Sept. 8, 1960
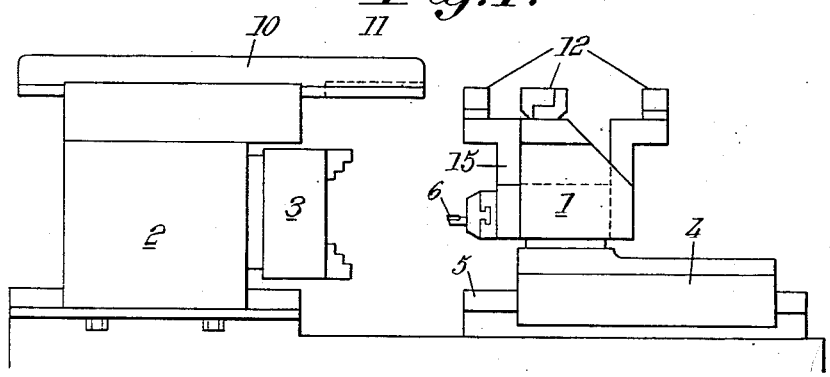
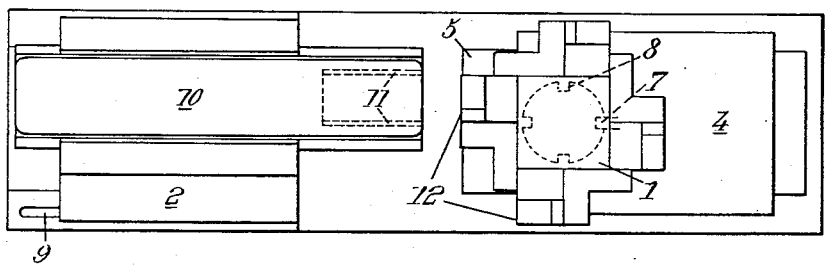
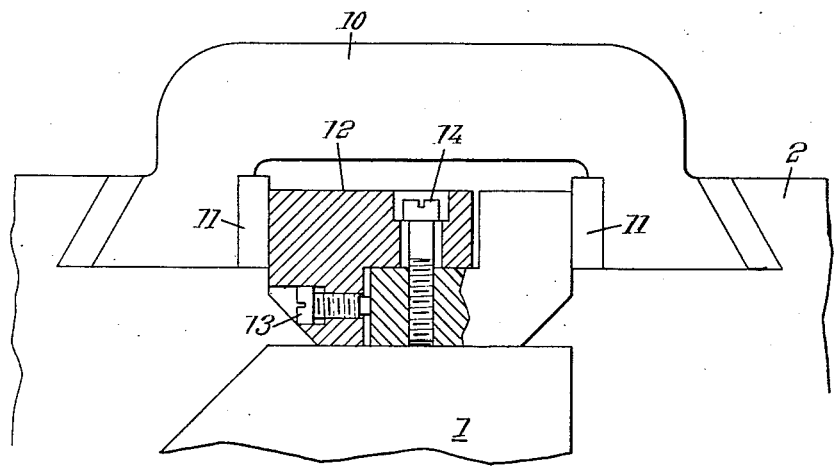

United States Patent Office 3,112,664
Patented Dec. 3, 1963

3,112,664
MACHINE TOOL HAVING A TURRET HEAD
AND AUXILIARY GUIDE MEANS
Jacques Sadier, Paris, France, assignor to Societe R. S.
Stokvis & Fils S.A., Paris, France, a society of France
Filed Sept. 8, 1960, Ser. No. 54,778
Claims priority, application France Sept. 9, 1959
2 Claims. (Cl. 82—34)

The present invention relates to machine-tools comprising a turret-head rotatable about an axis perpendicular to the tool feed direction so as to bring one of the working faces of said turret-head, and therefore the tool it carries, opposite a workpiece holder. More particularly, but not exclusively, this invention is concerned with semi-automatic or automatic turret-lathes having a turret-head mounted as above stated.

The object of this invention is to provide a machine-tool of the above mentioned kind which is better adapted to meet the requirements of practice than those known up to this time, in particular, concerning the guiding of the feed movement of the turret head during machining operations.

It is already known to provide, in addition to the normal, or conventional, guiding means, auxiliary guiding means, operative at least during the portions of the relative translatory movements of the turret-head and the workpiece holder that correspond to machining periods of the tool.

According to the present invention, the cooperating portions of said auxiliary guiding means, which are carried respectively by the workpiece holder and by each of the working faces of the turret-head engage one another exclusively along plane surfaces all parallel to a plane parallel to the direction of feed and preferably also parallel to the preferential thermal expansion direction of the workpiece holder when the machine grows hot.

Preferred embodiments of the present invention will be hereinafter described with reference to the accompanying drawings, given merely by way of example and in which:

FIG. 1 is a diagrammatical elevation view of a turret lathe made according to the invention.

FIG. 2 is a plane view corresponding to FIG. 1.

FIG. 3 shows, on an enlarged scale with parts cut away, the auxiliary guiding means diagrammatically illustrated on FIGS. 1 and 2.

The lathe shown by the drawings comprises a turret-head 1 having a vertical axis and capable of undergoing translatory movements with respect to a workpiece holder consisting of a headstock 2 adjustable in position and provided with a chuck 3 for holding the workpiece.

As shown by FIGS. 1 and 2, turret-head 1 is mounted on a carriage 4 movable along slides 5 parallel to the direction of feed of the tool, the displacements of this carriage being controlled by a feed mechanism not illustrated on the drawings.

Turret-head 1 carries a plurality of working faces, for instance four of them, each of these faces carrying a tool 6.

Means are provided for locking turret-head 1 in one of its four positions about its axis. Such means are illustrated on FIG. 2 in the form of a locking member 7 mounted on carriage 4 and adapted to engage in one of a series of four notches 8 provided in said turret-head and located at 90° to each other, one of said notches coming opposite said locking member 7 in each of the working positions of the turret-head.

The headstock 2 is movable along slides 9 parallel to the direction of feed of turret-head 1, so that said headstock can be adjusted in position in accordance with the dimensions of the workpiece to be machined.

Now, in a known manner, headstock 2 and each of the working faces of turret-head 1 are provided with cooperating auxiliary guiding means having complementary surfaces disposed parallel to the movement of feed of the turret-head and coming into action at least when the operative tool is acting upon the workpiece to be machined.

Up to the present time, the above mentioned auxiliary guiding means consisted of a cylindrical guiding bar carried by the headstock and cooperating during the machining strokes with a sleeve carried by the working face of the turret-head actually in operation, each of the working faces of the turret-head being provided with such a sleeve. In some cases, the working parts are carried by the turret-head and the sleeve by the headstock.

Such auxiliary guiding means are not wholly satisfactory for the following reasons:

First, the inertia of the guiding bar is relatively low;

Secondly, the maximum pressures are concentrated along a generatrix of the guiding bars and sleeves due to their cylindrical shape;

Finally, it was impossible to ensure a free thermal expansion of the headstock in its preferential thermal expansion direction under the effect of the heat produced by the action of the tool on the workpiece, such an impossibility increasing the risk of developing detrimental stresses in the auxiliary guiding means.

According to the present invention, the cooperating auxiliary guiding means engage one another exclusively on plane surfaces all parallel to a plane itself parallel to the direction of feed of the tool and also parallel to the preferential thermal expansion direction of the headstock 2; said direction, in the example that is illustrated by the drawings, is the vertical direction. Furthermore, the guiding surfaces carried by the headstock are provided on a piece of adjustable position having a relatively high inertia.

In the example shown, the auxiliary guiding means are constituted:

On the one hand, by an adjustable block 10 carried by headstock 2 and movable in the longitudinal direction, said block constituting the support of two slideways having plane faces which are parallel to the direction of feed of the tools and extending in the vertical direction;

And, on the other hand, four sliders 12 having parallel vertical side faces and carried respectively by each of the working faces of turret-head 1, said sliders being adapted to engage with a sliding fit between slideways 11.

Anyway, when one of the working faces of turret-head 1 is in operation, the corresponding slider 12 is applied, due to the reaction of the workpiece on the tool, against one or the other of slideways 11, according to the direction of rotation of chuck 3, the slideway that is thus brought into action working over its whole surface, thereby reducing the pressures per unit of area and therefore the risks of wear, both of the slideway and of the slider.

On the other hand, possible thermal expansions of the headstock 2 in the vertical direction cause only a slight off-setting in the vertical direction of slideways 11, such an off-setting having no detrimental effect upon the operation of the auxiliary guiding means.

Concerning sliders 12, they may advantageously be made in such manner that each of them comprises two pieces of complementary shapes engaged in one another and subjected to the action of a first set of screws 13 which permit of adjusting the distance between them in the transverse direction and of a second set of screws 14 which permit of securing them against each other once their distance has been adjusted.

The fixation of each of the tools 6 on the corresponding working face of turret-head 1 is advantageously performed in the following manner:

Each of the tools 6 is carried by a support 15 fixed against the corresponding working face of turret-head 1, for instance by screwing, each of said supports 15 having at least one dimension (and preferably both of its dimensions) greater than the corresponding dimension of said working face so that support 15 projects on at least one side of the corresponding face of turret-head 1.

Said supports 15 are fixed together through any suitable means, for instance by screwing, so as to form together, about the body of the turret-head, a single unit which contributes in still increasing the rigidity of the system formed by turret-head 1 proper, supports 15 and the tools 6 carried by said supports.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A machine tool which comprises, in combination, a frame, a multiple face turret-head carried by said frame, a headstock also carried by said frame, at least one of the two last mentioned elements being mounted slidable in said frame in a longitudinal feed direction, slide means carried by said frame for guiding said slidable element in said longitudinal feed direction, said turret-head being adjustable with respect to said frame by rotation about an axis perpendicular to said longitudinal feed direction, and cooperating auxiliary guiding means carried respectively by said headstock and by each of the faces of said turret-head, the guiding means carried by said headstock consisting of two flat walls located opposite each other and parallel both to the direction of said turret axis and to said longitudinal feed direction, the guiding means carried by each of the faces of said turret-head consisting of two flat walls parallel to each other and at a distance from each other equal to the distance between said two first mentioned flat walls, and adapted to cooperate with said two first mentioned flat walls respectively for a position of said turret-head about said axis.

2. A machine-tool according to claim 1 in which said axis about which said turret-head is rotatable is vertical, so that said flat walls are vertical.

References Cited in the file of this patent

UNITED STATES PATENTS

| | | |
|---|---|---|
| 497,769 | Canradson | May 23, 1893 |
| 968,052 | Hanson | Aug. 23, 1910 |
| 1,795,594 | Class | Mar. 10, 1931 |
| 1,932,984 | Nenninger et al. | Oct. 31, 1933 |
| 2,536,175 | Hansen | Jan. 2, 1951 |
| 2,593,230 | Walter | Apr. 15, 1952 |

FOREIGN PATENTS

| | | |
|---|---|---|
| 365,738 | Great Britain | Jan. 28, 1932 |